United States Patent [19]

Van Den Ouweland et al.

[11] Patent Number: 5,695,802
[45] Date of Patent: Dec. 9, 1997

[54] FLAVORING COMPOSITION AND PROCESS

[75] Inventors: Godefridus Van Den Ouweland; Sina Dorothea Escher, both of Confignon; François Benzi, Geneva, all of Switzerland; Claude Vanrietvelde, St-Julien-en-Genevois, France

[73] Assignee: Firmenich SA, Geneva, Switzerland

[21] Appl. No.: 596,133

[22] PCT Filed: Jun. 13, 1995

[86] PCT No.: PCT/IB95/00478

§ 371 Date: Feb. 9, 1996

§ 102(e) Date: Feb. 9, 1996

[87] PCT Pub. No.: WO95/34222

PCT Pub. Date: Dec. 21, 1995

[30] Foreign Application Priority Data

Jun. 16, 1994 [CH]  Switzerland ............................ 1899/94

[51] Int. Cl.$^6$ ................... A23L 1/226; A23L 2/56
[52] U.S. Cl. .................. 426/533; 426/534; 426/590; 426/601; 426/608; 426/613; 426/650
[58] Field of Search .................. 426/633, 533, 426/534, 601, 630, 590, 608, 613, 650

[56] References Cited

U.S. PATENT DOCUMENTS

| | | | |
|---|---|---|---|
| H1591 | 9/1996 | Fulcher | 426/601 |
| 2,835,593 | 5/1958 | Rusoff | 426/533 X |
| 4,284,655 | 8/1981 | Miller et al. | 426/602 |
| 4,384,008 | 5/1983 | Millisor | 426/613 |
| 4,414,229 | 11/1983 | Bakal et al. | 426/98 |
| 5,092,964 | 3/1992 | Conte, Jr. et al. | 203/29 |
| 5,149,642 | 9/1992 | Mazur et al. | 435/135 |
| 5,271,949 | 12/1993 | Haring et al. | 426/317 |
| 5,496,580 | 3/1996 | Amano et al. | 426/534 |

FOREIGN PATENT DOCUMENTS

| | | |
|---|---|---|
| 0 059 997 A2 | 9/1982 | European Pat. Off. . |
| 0 074 140 A2 | 3/1983 | European Pat. Off. . |
| WO 92/00678 | 1/1992 | WIPO . |

Primary Examiner—Donald E. Czaja
Assistant Examiner—Sean Vincent
Attorney, Agent, or Firm—Pennie & Edmonds LLP

[57] ABSTRACT

The flavoring composition of the invention contains the diglyceridic fraction of a hydrolysate of vegetable or animal fat, optionally in combination with other substances susceptible of improving the impact and mouthfeel of said composition and of the food products wherein the composition is incorporated.

18 Claims, No Drawings

FLAVORING COMPOSITION AND PROCESS

TECHNICAL FIELD

Flavoring food products which have a low content in fats, i.e. the so-called "light" or low-calorie foods, presents particular difficulties. Whereas it is possible to compensate more or less adequately the gustative or taste notes characteristic of said fats, through addition of appropriate flavoring ingredients, there remains the problem related to the difficulty in reconstituting or reproducing, in the light or defatted product, the feeling in the mouth or "mouthfeel" and the creamy-type consistency or texture which are precisely imparted by said fat materials. This problem is particularly acute in dairy products and light margarines, as well as in mayonnaises and ice-creams.

It is the aim of the present invention to provide an original solution to this problem. We have discovered that the mouthfeel of a food product, namely of a product having a low fat content, can be improved by adding to this product a particular flavoring composition.

DESCRIPTION OF THE INVENTION

It is therefore one object of the invention to provide a process for the preparation of a flavoring composition, characterized in that there is added to a flavoring ingredient, solvent or adjuvant of current use the diglyceride fraction of an animal or vegetable fat hydrolysate.

According to the invention, the animal or vegetable fat or oil can be formed by butter, milk cream or fat, fish oil, beef fat, chicken fat, pork fat, mutton or lamb fat, olive oil or peanut oil, for example.

In the following description, the terms fat and oil will be used interchangeably to designate the fat material of animal or vegetable origin which, once hydrolysed, provides the diglyceride fraction serving to prepare the flavoring compositions according to the invention.

According to a preferred embodiment of the process of the invention, the hydrolysate of animal or vegetable fat is a butter or milk hydrolysate.

It has been known to use butter hydrolysates, obtained by enzymatic hydrolysis of butter oil or fat, to impart creamy and rich notes to dairy products in particular. However, we have now surprisingly discovered that it is possible to improve the mouthfeel of flavoring compositions intended for use in defatted or low-fat products by adding to said compositions certain ingredients, present in butter hydrolysate or in the hydrolysates of other animal or vegetable fats, carefully selected for their enhanced mouthfeel effect, established on the basis of organoleptic evaluations carried out by expert flavorists.

Butter hydrolysate is conventionally obtained through the action of an enzyme such as a lipase on butter oil or fat. This oil or fat is typically the residue obtained from melted and centrifuged butter once the water has been eliminated. Alternatively, one can also carry out the hydrolysis of the melted butter and then separate the aqueous layer from the neutral and acid parts, which form the hydrolysate.

The latter thus comprises an acid phase or fraction which contains the fatty acids released through the hydrolysis of the butter oil, and a neutral phase comprising the glycerides. The latter include triglycerides, diglycerides and monoglycerides derived from the butter rally acids. As is described further on, these three glyceride fractions can be separated from each other and their individual organoleptic properties evaluated. As a result of such evaluations, it has been established that it is the diglyceride fraction which best possesses the organoleptic properties commonly associated with fats and that, as a result, it can be advantageously used to improve the mouthfeel of the products into which it is incorporated.

According to a preferred embodiment of the process of the invention, said process further comprises adding one or several compounds selected from the group consisting of butyric acid, decanoic add, hexanoic acid, octanoic acid, dec-9-enoic acid, 4-methylnonanoic acid, 4-methyloctanoic acid, 2-methylheptanoic acid, oleic acid, hexadecanoic acid, pentadecanoic acid, 2-methylhexanoic acid, 2-methylbutanoic acid, heptadecanol, hexadecanol and 2-tetradecanone. We observed that the addition of the above-mentioned compounds reinforced the rich, creamy and full taste feeling of the composition and that the foods flavored by means of said composition where preferred in the evaluation tests described further on. In particular, the flavoring compositions obtained through addition of a mixture of oleic, palmitic, 4-methylnonanoic, 4-methyloctanoic, 4-methylheptanoic, 2-methylhexanoic and 2-methylbutanoic acids provided much appreciated results.

As is apparent from the examples presented further on, the flavoring compositions obtained by adding to the diglyceride fraction of a butter hydrolysate, or of a hydrolysate of any other of the mentioned fats, a mixture of butyric acid, decanoic acid, hexanoic acid, octanoic acid, dec-9-enoic acid, 4-methylnonanoic acid, 4-methyloctanoic acid, 2-methylheptanoic acid, oleic acid, palmitic acid, pentadecanoic acid, 2-methylhexanoic acid, 2-methylbutanoic acid, heptadecanol, hexadecanol and 2-tetradecanone, turned out to be particularly efficient in emulating the texture and mouthfeel of the fat materials present in butter or milk for example.

According to a variant of the invention, there is obtained a flavoring composition by adding to a hydrolysate of an animal or vegetable fat or oil, in particular to a butter hydrolysate, at least one compound selected from the group consisting of butyric acid, decanoic acid, hexanoic acid, octanoic acid, dec-9-enoic acid, 4-methylnonanoic acid, 4-methyloctanoic acid, 2-methylheptanoic acid, oleic acid, hexadecanoic acid, pentadecanoic acid, 2-methylhexanoic acid, 2-methylbutanoic acid, heptadecanol, hexadecanol and 2-tetradecanone. This variant of the composition according to the invention is a result of the fact that we have discovered that adding the above-mentioned compounds enhanced the organoleptic effect of the butter hydrolysate already known, as well as that of other animal or vegetable fat hydrolysates, rendering the flavoring composition more natural and creamy, as well as with a fuller body, such that the low-fat foods into which this composition was incorporated produced a feeling in the mouth which was judged comparable to that of the non-defatted food.

According to a preferred embodiment of this variant, there is added to the animal or vegetable fat hydrolysate, or more particularly to the butter hydrolysate, a mixture of all of the above-mentioned compounds. According to another embodiment, a mixture of oleic, palmitic, 4-methylnonanoic, 4-methyloctanoic, 2-methylheptanoic, 2-methylhexanoic and 2-methylbutanoic acids is added thereto.

Moreover, particularly useful results, from an organoleptic point of view, were also found to be obtained when the hydrolysate of an animal or vegetable fat, to which the above-mentioned compounds were added, contained at least about 30% by weight of diglycerides and not more than 2% by weight of monoglycerides, relative to the weight of the hydrolysate. The term "essentially free from any mono- or triglycerides" is used herein to define such an hydrolysate.

Such hydrolysates are obtained by subjecting the starting fat or oil to enzymatic hydrolysis under the particular conditions described further on and for an amount of time sufficient to obtain an enrichment of the hydrolysate in diglyceride fraction.

It has in fact been established that when one or more of the above-mentioned compounds were added to a hydrolysate such as described above, there were obtained particularly effective flavoring compositions. Their organoleptic effect enhancing the mouthfeel of the foods into which these flavoring compositions were incorporated was even more marked when said hydrolysate contained 50% or more by weight of diglycerides.

The flavoring composition resulting from the process of the invention is also an object of the latter and can be used to improve or enhance the mouthfeel of a great variety of edible products. One can cite, by way of example, light or low-fat margarines and butters, yoghurts, ice-creams and frozen desserts, cheeses, milk and dairy products, including milk-based or derived drinks, as well as foodstuffs such as ready-to-eat cooked meals, mayonnaises, soups, sauces, sweet or savory biscuits, snacks, namely potato chips, or yet desserts.

In a general manner, all the low-calorie or light foods can be improved, as regards their taste, texture and mouthfeel, by means of the flavoring composition according to the invention.

It goes without saying that, even if the flavoring composition of the invention is particularly useful for flavoring low-fat products, it is clear that it can also be used for flavoring normal foods, with the usual fat content, to which one may wish to impart a fuller and creamier texture, or enhance the organoleptic qualities thereof associated with the presence of fats. Such is the case for example of meat type preparations, wherein the flavoring compositions of the invention based on mutton, beef or pork fat hydrolysates revealed themselves particularly useful and efficient for the desired aim.

The concentration in which this composition can be added to the varied foods above-mentioned is of course dependent on the nature of the latter and on the flavoring effect that one desires to achieve. This concentration can therefore vary in a wide range of values. By way of example, concentrations of the order of 0.001 to 1.0% by weight, relative to the weight of the foodstuff or beverage to which the composition is added, can be cited.

The flavoring composition of the invention can be added to the foods either alone or in admixture with other flavoring ingredients of current use, the function of which is to affect the taste of the food rather than its texture or mouthfeel.

As it has already been cited, hydrolysates from animal or vegetable fats, and more particularly butter hydrolysate, used either as a constituent of the flavoring composition according to the invention, or as the starting product for preparing the diglyceride fraction which is a component of said composition, is obtained by enzymatic hydrolysis of the animal or vegetable fat, namely of butter oil. Such an hydrolysis generates an acid fraction, composed by the fatty acids in a free state, and a neutral fraction containing said acids in a bonded state, in the form of triglycerides, diglycerides and monoglycerides, which fractions can be separated from each other. Depending on the hydrolysis conditions, the relative weight proportion of the acid and neutral fractions, as well as that of the three types of glycerides within said neutral fraction, can vary somewhat. It can be observed, in fact, that parameters such as the hydrolysis duration or time and the nature of the enzyme used can have an effect on these proportions and can therefore be used to influence the content of the hydrolysate in the diglyceride fraction which is particularly useful to confer a creamy texture to the flavored products, whereas the monoglyceride and the triglyceride fractions have far less impact in this respect. This is even more the case for the monoglyceride fraction, and the hydrolysates used according to the invention will preferably contain less than 2% by weight of the latter.

On the other hand, and in spite of the presence of a great variety of fatty acids in butter for example [see, for example, H. O. Goff and A. R. Hill, Dairy Science & Technology Handbook, ed. Y. H. Hui, VCH, Publishers Inc., N.Y., vol. 1, page 19 (1993)], and thus in a free state in the acid fraction of the butter hydrolysate, we have surprisingly discovered that only some of these acids seem to have a definite function in the rich and creamy impact imparted to the compositions to which they are added, and that the addition of these specific acids, either to the hydrolysate itself or to the diglyceride fraction thereof, presented clear advantages relative to the prior known use of said hydrolysate when not enriched in said acids.

Moreover, the addition of other acids having a shorter chain, namely branched, not previously identified in these fats or which are present but in very weak concentrations, as well as of hexadecanol, heptadecanol or 2-tetradecanone, proved to be just as advantageous and made it possible to improve the mouthfeel of foods flavored by way of the thus obtained compositions.

In the enzymatic hydrolysis of the animal or vegetable fat or oil, there can be used any lipase strain of current use in this type of reaction. Specific examples are cited further on, but the skilled person in the art is perfectly able to select said strain amongst those available to this effect.

One can thus cite by way of example, the enzymes obtained from yeasts of the genus *Candida* and *Torulopsis*, funguses of the genus *Rhizomucor, Rhizopus, Mucor, Penicillium, Aspergillus, Geotrichum* and bacteriae of the type *Pseudomonas, Achromobacter* and others. Appropriate lipases can be found on the market, such as for example Lipase Type XII (Sigma Corp.), Lipase (Boheringer), Enzo Lipase 1000 (EDC), Lipase preparation 7051 L (Rohm Tech.), Palatase (Novo Lab.), Lipase preparation 2212 F (Rohm Tech.), Flavor Age (Genencor), Biolipase (Biocon), Lipase (Chem. Dynamic Corp.), Lipomod (Biocatalysts).

In a general manner, the lipase is added to the molten fat material, the mixture homogenized and then incubated at an appropriate temperature, for an amount of time sufficient to allow a degree of hydrolysis of the order of at least 25 to 30%. The hydrolysate thus obtained can be used as such, or it can be emulsified to form a homogeneous paste. Alternatively, it can be spray-dried by means of encapsulation materials of current use (proteins, gelatines, caseinates, hydrocolloides, dextrines, starch and modified starch, maltodextrines, sugars, etc . . . ) and following current encapsulation methods.

On the other hand, the diglyceride fraction of these hydrolysates can be prepared according to the process schematically described hereinafter for butter hydrolysate and which is used in a general manner:

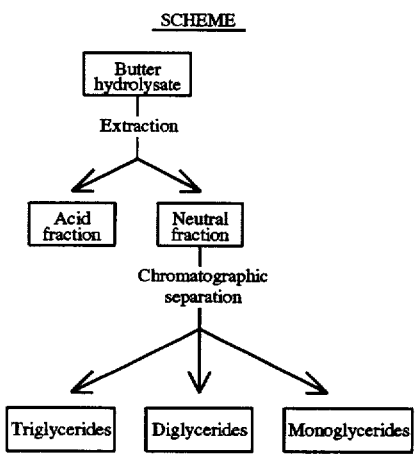

SCHEME

The detailed conditions of these methods are described in the examples presented further on.

Diglyceride fractions of the other animal or vegetable fats above-mentioned can be obtained in a similar manner to that described herebelow for butter.

The fatty acids and other varied compounds mentioned above, which can be added to the hydrolysates and/or to the diglyceride fraction of said hydrolysates, are commercial products.

It is to be noted that the invention thus provides flavoring compositions capable of improving or imparting the organoleptic characters generally associated with the presence of fatty materials or fats, namely the creamy texture and the enhanced and more voluminous mouthfeel. Therefore, the compositions according to the invention are able to replace, totally or partially, said fat materials in a great variety of light or low-calorie foodstuffs, but they can also serve to enhance the organoleptic properties thereof in the foodstufs which already contain said fat materials. The foodstuffs which comprise the flavoring compositions according to the invention have an enhanced impact and a longer-lasting taste in the mouth, as well as better mouthfeel, than the corresponding foods not flavored according to the invention.

Preparation of the hydrolysates

EXAMPLE 1

Preparation of a butter hydrolysate

In a 500 ml flask there were mixed 100 g of butter fat, 50 g of demineralized water and 1 g of enzyme of type Lipomod® 29 (lipase; origin: Biocatalysts Ltd., Great Britain). The mixture was well homogenized and stirred for 17 h at 40°–45° C. The temperature was increased to 90°–95° C. and the mixture stirred during 15 min. The oily and aqueous layers were then separated by centrifuging. The oily phase was diluted with 1 part of Neobee M 5 (triglyceride of capric/caprylic acid; origin: PVO Int. Inc., N.Y., USA) and the solution was partially deodorized by distilling twice through a distillation apparatus of the Leybold type ("flash-distillation") at 60° and 80° C. and a pressure of 13 Pa.

The thus obtained hydrolysate was used as such in the applications described further on.

The oily phase directly obtained from the hydrolysis possessed a very marked cheese-like organoleptic character and proved useful as such to improve the mouthfeel of cheese flavors and foodstuffs containing them.

EXAMPLE 2

Preparation of a diglyceride fraction of a butter hydrolysate

A butter hydrolysate (5.0 g) obtained as is described in example 1 was dissolved in diethyl ether (200 ml). The acid fraction was extracted with 5 portions of 20 ml each of a 1N aqueous solution of sodium hydroxide. The aqueous phases were balanced with a new portion of 100 ml of ether. The combined ether phases were washed twice with a solution saturated in sodium chloride, dried over magnesium sulfate and concentrated to constant weight (2.97 g). This neutral fraction represented about 60% by weight of the hydrolysate. The combined acid extracts were acidified to pH 1 by means of 50% aqueous $H_2SO_4$ and extracted again twice with 100 ml of ether. The ethereal layer was washed twice, with a solution saturated with sodium chloride, dried over magnesium sulfate and concentrated to constant weight (1.98 g). The thus obtained acid fraction represented about 40% by weight of the hydrolysate. The neutral fraction (2.95 g) was passed through a silica gel column of the Lobar type (dimension B; origin: Merck) and the components were successively eluted with hexane/ethyl acetate mixtures, 75:25 (400 ml), 50:50 (300 ml), 25:75 (200 ml), and ethyl acetate alone (150 ml). A thin layer chromatography was carried out on precoated silica gel plates (Merck), using a 70:30 hexane/ethyl acetate mixture as eluting agent. The separation of the triglyceride, diglyceride and monoglyceride phases was visualized by observing the respective spots in an atmosphere of iodine.

The $r_f$ values of these three phases, measured by thin layer chromatography, were as follows:

| triglycerides | $r_f = 0.7$ |
| diglycerides | $r_f = 0.2\text{--}0.4$ |
| monoglycerides | $r_f = 0.08$ |

The three fractions were recovered in separate containers and their composition confirmed by nuclear magnetic resonance spectroscopy (NMR). The weight proportions of these fractions were the following:

| triglycerides | 59.3% |
| diglycerides | 37.3% |
| monoglycerides | 3% |

The diglyceride fraction was used as such in the applications described hereinafter.

The method above was used with other butter hydrolysates obtained by enzymatic hydrolysis carried out under the conditions described in example 1, but using other lipases. The weight proportions of the various fractions obtained in these cases are indicated in the following table, as well as the nature of the lipase:

| Hydrolysate | Lipase | Acid fraction % | Neutral fraction % | Trigly-cerides % | Digly-cerides % | Mono-glycerides % |
|---|---|---|---|---|---|---|
| 2 | Palatase ® M[1)] | 33 | 64 | 70 | 27 | 1 |

[1)]origin: Novo Nordisk, Denmark

EXAMPLE 3

Preparation of butter hydrolysates

Several butter hydrolysates were prepared according to the following general method.

GENERAL METHOD

A 3 neck flask of 250 ml, equipped with a magnetic stirrer and heated by means of an oil bath to a temperature of about 40°–50° C., was charged with a mixture of 100 g of molten butter and with an emulsifier in the desired amount (0.1 to 0.2% by weight), this mixture having been well homogenized beforehand in a TURRAX® type apparatus. A homogenized mixture of water (amount required to obtain a good homogenate but, in any case not more than 5% by weight, relative to the weight of fat) and the desired amount of enzyme indicated in the table hereinafter. The mixture was allowed to react without stirring and samples of the hydrolysate were collected to measure the corresponding acid value (Acid value—A.V.) and thus obtain an estimation of the degree of hydrolysis. The sample is thus first heated for 15 min at 90° C. to stop the hydrolysis and then the acid value is established according to the standard method described in "IUPAC—Standard Methods for the Analysis of Oils, Fats and Derivatives, Pergamon Press, 5$^{th}$ ed., pages 52 and following (1979)". We observed in this manner that butter hydrolysates having the desired organoleptic properties could be obtained after about 7 to 8 h of hydrolysis, their composition varying nevertheless as a function of the nature of the enzyme used, as well as of its weight concentration relative to the weight of molten butter. The composition of the hydrolysates thus obtained was established by high pressure liquid chromatography (HPLC).

A diol-column of the Nucleosil 7 type (length 25 cm approx., i.d. 4 mm), i.e. wherein silica is bonded to —(CH$_2$)$_3$—O—CH(OH)—CH$_2$OH in normal-phase mode, and the following conditions:

Solvent A: hexane
Solvent B: 2-propanol
Elution: 1.0 ml/min, % B=8%
Detection: UV (diode array detector—DAD) at 230 nm
Injection: 20 mg (20 µl full loop)

Each time, the column is calibrated beforehand with the fat having served to provide the hydrolysate, in the present case melted butter.

This method made it possible to directly obtain the concentration of the butter hydrolysate in triglycerides and monoglycerides, the elution of these two types of glycerides being well separated in time. We established in this manner that the hydrolysates obtained as described above all contained less than 2% by weight of monoglycerides.

Following this method, the elution of the diglycerides is superimposed on that of the free fatty acids formed during the hydrolysis. Therefore, either the free fatty acids are first separated from the hydrolysate to obtain the exact concentration of diglycerides in the latter, or the concentration of these diglycerides is estimated from the global content of the hydrolysate in diglycerides and free fatty acids, which content is obtained by HPLC. In fact, since it is known that there is pratically no formation of monoglycerides, the diglycerides and the free fatty acids are present in the hydrolysate in equimolar amounts. Consequently, the concentration of diglycerides can be calculated from the ratio between the molecular weight of the diglyceride and the molecular weight of (diglyceride+fatty acid), which ratio has an average value of about 0.69 for the various diglycerides and corresponding fatty acids characteristic of fats such as butter, mutton fat, chicken fat, pork fat, olive oil, etc ... (for example, such ratios are, for oleine: 0.688; capreine: 0.699; stearine: 0.688; palmitine: 0.689; caproine: 0.713). Thus, for example, in a butter hydrolysate having a measured content in triglycerides of 60%, the concentration in diglycerides was estimated to be of about (100−60)×0.69= 27.6%.

The contents in diglycerides cited in the Table presented hereafter were calculated this way.

According to the general method described here-above, there were prepared the butter hydrolysates mentioned in the Table here-below (emulsifier: 0.2 g of DIMODAN PV, origin: Grindsted Products A/S, Denmark). These hydrolysates possessed the appropriate organoleptic properties required for the aim of the invention.

| ENZYME OR YEAST | | Hydrolysis time h | Acid value (A.V.) | HYDROLYSATE COMPOSITION[b)] | | |
|---|---|---|---|---|---|---|
| Nature | Concen-tration[a)] | | | Triglycerides % | Diglycerides % | N° |
| Candida Cilindracea* | 0.2 | 7 | 95 | 20 | 55 | 1 |
| Candida Cilindracea* | 0.1 | 7 | 70 | 41 | 41 | 2 |
| Candida Cilindracea* | 0.05 | 7 | 37 | 59 | 28 | 3 |

TABLE-continued

| ENZYME OR YEAST | | Hydrolysis time h | Acid value (A.V.) | HYDROLYSATE COMPOSITION[b] | | |
|---|---|---|---|---|---|---|
| Nature | Concentration[a] | | | Triglycerides % | Diglycerides % | N° |
| Lipomod 187 P* | 0.2 | 7 | 49 | 42 | 40 | 4 |
| Pseudomonas Fluorescens* | 0.2 | 7 | 66 | 18 | 57 | 5 |

[a] % by weight, relative to the weight of melted butter
[b] % by weight, relative to the weight of hydrolysate
*origin: Biocatalysts Ltd.

EXAMPLE 4

Preparation of mutton fat hydrolysates

Mutton fat hydrolysates were prepared according to the general method described in Example 3 and replacing the butter with mutton fat. The Table hereafter summarizes the characteristics of the obtained hydrolysates, using as emulsifier DIMODAN PV (0.1 or 0.2%), which hydrolysates revealed themselves useful for preparing the flavoring compositions according to the invention.

TABLE

| ENZYME OR YEAST | | Hydrolysis time h | Acid value (A.V.) | HYDROLYSATE COMPOSITION[b] | | |
|---|---|---|---|---|---|---|
| Nature | Concentration[a] | | | Triglycerides % | Diglycerides % | N° |
| Palatase M 1000* | 2.0 | 8 | 37 | 49 | 35 | 1 |
| Palatase M 1000* | 8.0 | 8 | — | 47 | 37 | 2[c] |
| Pseudomonas Fluorescens** | 0.15 | 8 | 62 | 29 | 49 | 3 |
| Candida Cilindracea** | 0.20 | 8 | 69 | 22 | 54 | 4 |
| Lipomod 187 P** | 0.20 | 8 | 43 | 43 | 38 | 5 |
| Mucor Michi** | 0.45 | 8 | 53 | 42 | 40 | 6 |
| Sigma L 3126*** | 0.30 | 8 | 32 | 52 | 33 | 7 |
| Palatase M 1000* Lipomod 187 P** | 4.0 1.0 | 24 | — | 61 | 27 | 8[c] |
| Palatase M 1000* Lipomod 187 P** | 6.0 1.5 | 8 | — | 12 | 61 | 9[c] |

[a] % by weight, relative to the weight of mutton fat
[b] % by weight, relative to the weight of hydrolysate
[c] concentration of the emulsifier: 0.1% by weight
*origin: Novo Nordisk
**origin: Biocatalysts Ltd.
***origin: Sigma Corp.

EXAMPLE 5

Preparation of hydrolysates from animal or vegetable fats

Several hydrolysates of a variety of fats were prepared following the general method described in Example 3, trader the conditions indicated in the Table hereafter. Unless otherwise indicated, there was used as emulsifier DIMODAN PV at 0.1% by weight.

TABLE

| ENZYME OR YEAST | | Hydro- | | Acid | HYDROLYSATE COMPOSITION[b] | | |
|---|---|---|---|---|---|---|---|
| Nature | Concentration[a] | lysis time | Type of fat | value (A.V.) | Triglycerides % | Diglycerides % | N° |
| Palatase M 1000* | 2.0 | 8 | butter | — | 53 | 32 | 1 |
| Palatase M 1000* | 8.0 | 8 | butter | — | 52 | 33 | 2[c] |
| Palatase M 1000* | 8.0 | 8 | butter | — | 49 | 35 | 3[d] |
| Palatase M 1000* | 8.0 | 24 | butter | — | 26 | 51 | 4[d] |
| Palatase M 1000* | 8.0 | 8 | butter | — | 31 | 48 | 5 |
| Palatase M 1000* | 8.0 | 24 | butter | — | 19 | 56 | 6 |
| Palatase M 1000* Lipomod 187 P** | 2.0 0.5 | 24 | butter | — | 47 | 37 | 7 |
| Palatase M 1000* Lipomod 187 P** | 4.0 1.0 | 8 | butter | — | 36 | 44 | 8 |
| Palatase M 1000* Lipomod 187 P** | 6.0 1.5 | 8 | butter | — | 12 | 61 | 9 |
| Candida Cilindracea** | 0.2 | 8 | olive oil | 94 | 24 | 51 | 10 |
| Candida Cilindracea** | 0.2 | 8 | peanut oil | 92.6 | 35 | 45 | 11 |
| Candida Cilindracea** | 0.2 | 8 | chicken | 99.0 | 20 | 55 | 12 |
| Candida Cilindracea** | 0.2 | 8 | cocoa butter | 88.0 | 21 | 55 | 13 |
| Palatase M 1000* | 8.0 | 8 | olve oil | — | 41 | 41 | 14 |
| Palatase M 1000* | 8.0 | 8 | olive oil | — | 45 | 38 | 15[d] |
| Palatase M 1000* Lipomod 187 P** | 6.0 1.5 | 8 | olive oil | — | 40 | 41 | 16 |
| Palatase M 1000* | 8.0 | 8 | chicken | — | 46 | 37 | 17[d] |
| Palatase M 1000* | 8.0 | 8 | chicken | — | 33 | 46 | 18 |
| Palatase M 1000 | 4.0 | 8 | chicken | — | 24 | 52 | 19 |
| Lipomod 187 P** Palatase M 1000* Lipomod 187 P** | 1.0 6.0 1.0 | 8 | chicken | — | 15 | 59 | 20 |
| Palatase M 1000* | 8.0 | 8 | beef | — | 38 | 43 | 21 |
| Palatase M 1000 Lipomod 187 P** | 6.0 1.5 | 8 | beef | — | 45 | 38 | 22 |
| Palatase M 1000* | 8.0 | 8 | pork | — | 59 | 28 | 23[d] |
| Palatase M 1000* | 8.0 | 8 | pork | — | 37 | 43 | 24 |
| Palatase M 1000* | 8.0 | 8 | pork | — | 42 | 40 | 25[e] |
| Palatase M 1000* | 4.0 | 8 | pork | — | 27 | 50 | 26 |
| Palatase M 1000* Lipomod 187 P** | 6.0 1.5 | 8 | pork | — | 25 | 52 | 27 |

[a] % by weight, relative to the weight of fat
[b] % by weight, relative to the weight of hydrolysate
[c] emulsifier: 2% by weight of butter protein
[d] emulsifier: 0.1% by weight of lecithin
[e] emulsifier: 0.1% by weight of TRIODAN; origin: Grinsted Products
*origin: Novo Nordisk
**origin: Biocatalysts Ltd.

The hydrolysates cited in this table are useful for imparting the required creamy, fatty and mouthfeel characters to the flavoring compositions according to the invention.

The invention will now be described in a more detailed manner by way of the following examples.

Embodiments of the invention

EXAMPLE 6

Flavoring compositions

A base flavoring composition of the butter type was prepared with the following ingredients:

| Ingredients | Parts by weight |
| --- | --- |
| Acetylmethylcarbinol | 40 |
| Redist butyric acid | 20 |
| Redist. hexanoic acid | 30 |
| Redist. decanoic acid | 15 |
| 5-Decanolide | 80 |
| Diacetyl | 50 |
| Neobee M 5 | 765 |
| Total | 1000 |

This base composition (130 ppm), and the ingredients indicated in the Table below, were added in the cited proportions to salty aqueous solutions having 0.5% NaCl, for evaluation.

TABLE

| Ingredients | Solutions (ppm) | | | | | | | |
| --- | --- | --- | --- | --- | --- | --- | --- | --- |
| | A | B | C | D | E | F | G | H |
| Base composition | 100 | 100 | 100 | 100 | 100 | 100 | 100 | 100 |
| Butter hydrolysate[1] (BH) | 30 | — | 23 | 23 | 23 | — | — | 15 |
| Diglyceride fraction of BH[2] | — | 30 | 7 | — | — | 15 | 15 | 5 |
| 1-Hexadecanol | — | — | — | 7 | — | 15 | — | 5 |
| 2-Tetradecanone | — | — | — | — | 7 | — | 15 | 5 |

[1] see namely example 1 or example 3, hydrolysate n° 1, or example 5, hydrolysate n° 4 or n° 6.
[2] see example 2

The flavored solutions thus prepared were evaluated on a blind test by a panel of 15 expert flavorists who were asked to judge the organoleptic quality of these solutions, both one relative to the other and with regard to the solution of the base composition.

According to the unanimous opinion of the flavorists, the solutions A and B possessed a creamier, more buttery taste than that of the base composition, with a better mouthfeel and a fresher, dairy-like, flavor note. The impact of these compositions in the mouth was also longer-lasting. On the other hand, all the solutions A to H were preferred by a majority of flavorists, relative to the base composition, the solutions C and H having been particularly appreciated.

Similar results were obtained when the ingredients cited in the Table were added, in the same proportions, to a margarine having a low fat content (25%; origin: Migros, Switzerland).

EXAMPLE 7

Flavoring of skimmed milk

Unflavored skimmed milk (0% fat; origin: Valflora®, Migros, Switzerland) was aromatized by adding thereto the ingredients indicated hereafter, in the proportions cited, to prepare five samples of flavored milk:

| Ingredients | Samples (ppm) | | | | |
| --- | --- | --- | --- | --- | --- |
| | A | B | C | D | E |
| Diglyceride fraction of BH[1] | 500 | 500 | 500 | 500 | 500 |
| 9-Decenoic acid | — | 1 | — | — | — |
| 4-Methylnonanoic acid | — | — | 4 | — | — |
| 4-Methyloctanoic acid | — | — | — | 2 | — |
| 2-Methylheptanoic acid | — | — | — | — | 4 |

[1] see example 2

Samples A to E thus obtained were compared on a blind test with a sample of unflavored skimmed milk by a panel of twelve flavorists, who had to indicate their preference regarding the mouthfeel and flavor character of the samples.

All the flavorists preferred samples A to E to that of the unflavored skimmed milk. In their opinion, said samples had far more impact in the mouth. Samples C, D and E were particularly preferred, their taste having been judged similar, both in character and texture, to the taste of a non-skimmed milk.

EXAMPLE 8

Flavoring of skimmed milk

Unflavored skimmed milk (0% fat; origin: Valflora®, Migros, Switzerland) was aromatized by adding thereto the ingredients indicated hereafter, in the proportions cited, to prepare five samples of flavored milk:

| Ingredients | Samples (ppm) | | | | |
| --- | --- | --- | --- | --- | --- |
| | A | B | C | D | E |
| Diglyceride fraction of BH[1] | 500 | 500 | 500 | 500 | 500 |
| Butyric acid | — | 6 | — | — | — |
| Hexanoic acid | — | — | 2 | — | — |
| Octanoic acid | — | — | — | 4 | — |
| Decanoic acid | — | — | — | — | 2 |

[1] see example 2

Samples A to E thus obtained were compared on a blind test with a sample of unflavored skimmed milk by a panel of expert flavorists, who had to indicate their preference regarding the mouthfeel and flavor character of the samples.

All the flavorists preferred samples A to E to that of the unflavored skimmed milk. Amongst said samples, a marked preference for the samples C, D and E was observed. In the flavorists' opinion, they all possessed a creamy, fresh, milk-like taste and a more natural and less fatty butter note than that of sample B.

EXAMPLE 9

Flavoring of skimmed milk

Unflavored skimmed milk (0% fat; origin: Valflora®, Migros, Switzerland) was aromatized by adding thereto the ingredients indicated hereafter, in the proportions cited, to prepare five samples of flavored milk:

| Ingredients | Samples (ppm) | | | | |
|---|---|---|---|---|---|
| | A | B | C | D | E |
| Diglyceride fraction of BH[1] | 500 | 500 | 500 | 500 | 500 |
| 2-Methylhexanoic acid | — | 2 | — | — | — |
| 2-Methylbutanoic acid | — | — | 3 | — | — |
| 9-Decenoic acid | — | — | — | 0.1 | — |
| Dimethylacrylic acid | — | — | — | — | 2 |

[1] see example 2

With these mixtures and the ingredients cited hereafter, there were prepared samples of flavored skimmed milk, by adding to an unflavored skimmed milk (0% fat; origin: Migros, Switzerland) the following ingredients, in the proportions indicated (ppm):

| Ingredients | Samples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Butter hydrolysate (BH)[1] | 2000 | — | 2000 | — | 2000 | 2000 | 2000 | — | — | — | 2000 | — |
| Diglyceride fraction of BH[2] | — | 2000 | — | 2000 | — | — | — | 2000 | 2000 | 2000 | — | 2000 |
| Mixture A | — | — | 100 | 100 | — | — | — | — | — | — | — | — |
| Mixture B | — | — | — | — | 30 | 60 | 100 | 30 | 60 | 100 | — | — |
| Mixture C | — | — | — | — | — | — | — | — | — | — | 30 | 100 |

[1] see namely the hydrolysates cited in example 6
[2] see example 2

These samples were evaluated under the conditions described in the preceding examples. Once again, all the samples A to E were preferred to that of the unflavored skimmed milk. In their opinion, samples B and C in particular had a very creamy taste, giving a very marked sensation of fullness and volume in the mouth.

EXAMPLE 10

Flavoring of skimmed milk

Three flavoring mixtures were prepared by way of the following ingredients, added in the proportions indicated (parts by weight):

| Ingredients | Mixtures | | |
|---|---|---|---|
| | A | B | C |
| 2-Tetradecanone | 30 | 50 | — |
| Redist. butyric acid | 30 | 30 | — |
| Redist. hexanoic acid | 20 | 20 | — |
| Redist. octanoic acid | 40 | 20 | — |
| Redist. decanoic acid | 20 | 20 | — |
| 9-Decenoic acid | 40* | 40* | — |
| 4-Methyloctanoic acid | 20* | 20** | 20** |
| 4-Methylnonanoic acid | 40* | 40** | 40** |
| 2-Methylheptanoic acid | 40 | 30 | 30 |
| Oleic acid | 500 | 490 | 100 |
| Pentadecanoic acid | 40 | 40 | 40 |
| Hexadecanoic acid | 40 | 40 | — |
| Hexadecanol | 60 | 06 | — |
| Heptadecanol | 30 | 50 | — |
| 2-Methylhexanoic acid | 20 | 20 | 20 |
| 2-Methylbutanoic acid | 30 | 30 | 30 |
| Neobee M 5 | — | — | 720 |
| Total | 1000 | 1000 | 1000 |

*10% solution in Neobee M 5
**1% solution in Neobee M 5

In a first evaluation on a blind test, a panel of expert flavorists compared samples 1 to 4 among themselves and with a sample of unflavored skimmed milk.

The general opinion of the flavorists was that the four samples were better than that of the unflavored skimmed milk, from the point of view of the mouthfeel and the imparted creamy feeling.

Although samples, 3 and 4 were preferred for their mouthfeel, their taste was judged to have a cheese character which was too pronounced for a milk sample, and as a result, the flavor note of samples 1 and 2 was preferred by a majority of flavorists.

The panel subsequently evaluated on a blind test samples 5 to 12, comparing them to each other and to an tun flavored sample. Once again, the flavorists judged that all the samples possessed a far creamier and fuller texture, and more volume, than the unflavored mill and were therefore preferred to the latter. Furthermore, samples 5 and 10–12, were particularly preferred, their taste, as regards mouthfeel, having been judged comparable to that of a non-skimmed milk.

EXAMPLE 11

Flavoring of margarine

To a commercial "low-fat" margarine (40% of fat; origin: Migros, Switzerland) there were added 0.2% of a flavoring composition according to the invention containing the following ingredients, in the proportions indicated (parts by weight):

|  | Compositions | | | |
| Ingredients | W | X | Y | Z |
| --- | --- | --- | --- | --- |
| Butter type flavor[1] | 910 | 910 | 910 | 910 |
| Butter hydrolysate (BH)[2] | 90 | — | 88.6 | — |
| Diglyceride fraction of BH[3] | — | 90 | — | 85.5 |
| Mixture B or C[4] | — | — | 1.4 | 4.5 |
| Total | 1000 | 1000 | 1000 | 1000 |

[1] 700051.05 P; origin: Firmenich SA, Geneva, Switzerland
[2] see example 6
[3] see example 2
[4] see example 10

4 Samples of flavored margarine were therefore obtained, which were then evaluated on a blind test by a panel of twelve flavorists and compared to the commercial margarine.

The results of these evaluations showed that the samples flavored according to the invention were systematically preferred to the commercial margarine, with a clear preference for the samples containing compositions Y and Z. According to the flavorists' opinion, the latter possessed a far creamier and rounded butter taste and a mouthfeel similar to that of a normal non-defatted margarine.

EXAMPLE 12

Flavoring of mayonnaise

To a commercial mayonnaise (33% of fat; origin: Migros, Switzerland) there were added 0.2% by weight of four flavoring compositions according to the invention containing the following ingredients (parts by weight):

|  | Compositions | | | |
| Ingredients | W | X | Y | Z |
| --- | --- | --- | --- | --- |
| Mayonnaise type flavor[1] | 850 | 850 | 850 | 850 |
| Butter hydrolysate (BH)[2] | 150 | — | 147.7 | 142.5 |
| Diglyceride fraction of BH[3] | — | 150 | — | — |
| Mixture B or C[4] | — | — | 2.3 | 7.5 |
| Total | 1000 | 1000 | 1000 | 1000 |

[1] 588 560 SPM; origin: Firmenich SA, Geneva, Switzerland
[2] see example 6
[3] see example 2
[4] see example 10

The four mayonnaise samples were judged on a blind test by a panel of expert flavorists who unanimously chose these samples relative to the commercial mayonnaise. In their opinion, the flavored mayonnaises were creamier and more natural than, the latter, and the improvement in the texture and mouthfeel of the product was particularly remarkable in the samples flavored by means of compositions Y and Z.

These effects were also observed, but even more markedly, with a 0% fat mayonnaise, conventionally prepared by means of the following ingredients:

| Ingredients | % |
| --- | --- |
| Water | 78.00 |
| Skimmed milk powder | 4.00 |
| Vinegar | 5.74 |
| Gums | 3.70 |
| Sugar | 3.00 |
| Modified potato starch | 3.00 |
| Salt | 1.50 |
| Mustard | 0.75 |
| Lactic acid | 0.13 |
| Citric acid | 0.14 |
| Sodium benzoate | 0.02 |
| Potassium sorbate | 0.02 |
| Total | 100.00 |

When there were added to the mayonnaise thus obtained 0.3% by weight of the flavoring compositions analogous to those cited above, but wherein the the mayonnaise type flavor was present at a rate of 40% by weight and the total of the other ingredients at a rate of 60% by weight, the relative weight ratio of said ingredients being identical, it was observed that the flavored mayonnaises, in particular those flavored with the compositions of type Y and Z, had a perfectly natural taste and a texture comparable to that of a non-defatted mayonnaise, and therefore had enhanced impact in the mouth. The flavoring compositions were thus able to successfully replace, as regards the flavor properties, the fats in the mayonnaise, without altering the other organoleptic qualities of the product.

EXAMPLE 13

Flavoring of potato chips

Potato chips were prepared, in a conventional manner, by means of the following ingredients:

| Ingredients | Weight (g) |
| --- | --- |
| Potato powder | 100.0 |
| Butter oil | 50.0 |
| Sugar | 30.0 |
| Salt | 7.5 |
| Lecithin | 3.0 |
| Corn starch | 30.0 |
| Powder yeast | 25.0 |
| Modified potato starch | 200.0 |
| Water | 400.0 |
| Total | 845.5 |

The chips thus obtained, which contained less than 4% moist and which content in fats was not above 10%, were flavored with 4% by weight of four flavoring compositions prepared in an analogous manner to that described in the preceding example but using a flavoring mixture prepared with the following ingredients:

| Ingredients | Parts by weight |
| --- | --- |
| Potato flavor[1] | 0.25 |
| Maltodextrine | 49.75 |
| Salt | 40.00 |
| Fat flavor[2] | 7.50 |
| Others* | 2.50 |
| Total | 100.00 |

*ingredients other than the flavor, such as cited in the preceding example, in the same relative proportions.
[1] 709.001.10 THP 05.93; origin: Firmenich SA, Geneva, Switzerland
[2] 92180.04 TP 06.93; origin: Firmenich SA, Geneva, Switzerland Upon the evaluation tests of the four samples of the potato chips flavored with compositions of the W, X, Y and Z type, it was observed that these chips had a rounder, more natural taste and more similar to the taste of potato chips having a normal fat content (~30%), than the unflavored chips. They presented the further advantage of not being fatty when touched, while having the same organoleptic qualities as the commercially available non-defatted potato chips.

EXAMPLE 14

Flavoring of sable biscuits

Sable biscuits having a low content in fats (24% by weight) were flavored by adding thereto 0.20% by weight of four butter type flavoring compositions, analogous to the compositions described in example 11, but which contained about 98% of butter flavor and 2% of total weight of the other ingredients, present in the same relative proportions.

The panel of twelve flavorists which evaluated on a blind test these four samples of flavored biscuits, relative to the unflavored sample, showed a unanimous preference for the former. In particular, the biscuits flavored by way of the compositions of X, Y and Z type were judged very tasty, with a full and soft taste, which could not be distinguished from that of the sable biscuits prepared with butter.

EXAMPLE 15

Flavoring of vanilla and chocolate puddings

A vanilla or chocolate pudding having 0% fat was prepared, in a conventional manner, by means of the following ingredients:

| Ingredients | Weight (g) |
| --- | --- |
| Fine granulated sugar | 69.10 |
| Dariolid ® QH[1] | 3.00 |
| Powder tetrasodium pyrophosphate | 1.30 |
| Calcium sulfate, dihydrate | 0.70 |
| Salt | 0.40 |
| Food coloring | 0.47 |
| Vanilline | 0.03 |
| Vanilla or chocolate flavor[2] | 0.60 |
| Total | 75.60 |

[1] alginate; origin: Kelco International GmbH, Germany
[2] Vanilla 54.286 BP0551 or chocolate 503.313 AP0551; origin: Firmenich SA, Geneva, Switzerland To this already flavored pudding there was added, at a rate of 0.3%, a flavoring composition according to the invention containing the following ingredients (parts by weight):

| Ingredients | Parts by weight |
| --- | --- |
| Vanilla or chocolate flavor[1] | 983.0 |
| BH component[2] | 16.4 |
| Mixture B or C[3] | 0.5 |
| Total | 1000.0 |

[1] see above
[2] butter hydrolysate or diglyceride fraction, or a mixture of both in equal proportions
[3] see example 10

Upon a blind evaluation of the puddings by a panel of six flavorisis, the latter unanimously preferred the pudding containing the flavoring composition according to the invention, having judged it creamier, with an enhanced consistency and a richer and rounder taste, which was also longer lasting in the mouth.

EXAMPLE 16

Frozen dessert

A frozen dessert was prepared by means of the following ingredients:

| Ingredients | % by weight |
| --- | --- |
| Skimmed milk (0% fat) | 71.527 |
| Litesse ®[1] | 11.000 |
| Sorbex ® RS[2] | 6.000 |
| Powder skimmed milk | 5.000 |
| Glucidex ® 12[3] | 4.000 |
| Paselli ® SA$_2$[4] | 2.000 |
| Meyprogen ® IC 304[5] | 0.400 |
| Aspartame ®[6] | 0.073 |
| Total | 100.000 |

[1] sugar substitute; origin: Pfizer AG, Zürich, Switzerland
[2] sorbitol; origin: Hefti AG, Zürich, Switzerland
[3] maltodextrine; origin: Roquette Frères, Lestrem, France
[4] modified starch; origin: Avebe International, Foxhol, Holland
[5] emulsifier; origin: Meyhall Chemical AG, Kreuzlingen, Switzerland
[6] origin: Nutrasweet AG, Zug, Switzerland These ingredients were mixed and the dessert was frozen according to current methods. At the same time, a dessert flavored according to the invention was prepared by adding to the dessert above-mentioned, before freezing, 0.3% of the flavoring composition according to the invention described in the preceding example.

The two frozen desserts were then evaluated on a blind test by a panel of expert flavorists, who showed unanimous preference for the dessert flavored according to the invention. In their opinion, its taste had an enhanced impact in the mouth and it was also longer lasting and creamier, with an improved mouthfeel.

EXAMPLE 17

Cheese from fresh cow milk

A base cheese from cow milk was prepared with the following ingredients, according to current methods:

| Ingredients | Weight |
| --- | --- |
| Milk | 961.0 |
| Calcium chloride | 38.0 |
| Rennet 1/15000 | 1.0 |
| Total | 1000.0 |

At the same time, cheeses flavored according to the invention were prepared by adding to said base cheese 0.1% of a flavoring composition prepared by means of the following ingredients (parts by weight):

| | Cheeses | |
| --- | --- | --- |
| Ingredients | A | B |
| Mozzarella type flavor[1] | 65 | 65 |
| BH component[2] | 35 | 33 |

-continued

| | Cheeses | |
|---|---|---|
| Ingredients | A | B |
| Mixture B or C[3] | — | 2 |
| Total | 100 | 100 |

[1]588 537 SPM; origin: Firmenich SA, Geneva, Switzerland
[2]see example 15
[3]see example 10

Cheeses A and B, as well as the base cheese, were then evaluated on a blind test by a panel of flavorists. In the opinion of the latter, cheeses A and B were distinctly better, from a taste point of view, than the base cheese. They had a richer and creamier texture and better impact and mouthfeel.

EXAMPLE 18

Flavoring of a chocolate drink

A base chocolate drink was prepared by mixing in a conventional manner the following ingredients:

| Ingredients | % |
|---|---|
| Partially skimmed milk | 85.60 |
| Sweetened condensed milk | 3.00 |
| Sugar | 8.00 |
| Dark chocolate crumb | 1.30 |
| Cocoa powder having 10% fat | 1.20 |
| Grinsted P-Fibre 150-F[1] | 0.40 |
| Subi SC-2[2] | 0.30 |
| Lygomme F447[3] | 0.10 |
| Vanilline | 0.10 |
| Total | 100.00 |

[1]origin: Grinsted Products A/S, Brabrand, Denmark
[2]emulsifier; origin: Dr. Otto Suwelack, Billerbeck, Germany
[3]stabiliser; origin: Sanofi Bio Industries, Paris, France This base drink was flavored by means of a flavoring composition containing the following ingredients:

| Ingredients | Parts by weight |
|---|---|
| Chocolate flavor[1] | 986.0 |
| BH component[2] | 13.5 |
| Mixture B or C | 0.5 |
| Total | 1000.0 |

[1]chocolate 503.313 AP0551; origin: Firmenich SA, Geneva, Switzerland
[2]see example 15
[3]see example 10

Upon adding 0.35% by weight of this flavoring composition to the base drink, a new beverage was obtained, the taste of which had far greater impact in the mouth and a better mouthfeel.

EXAMPLE 19

Flavoring of meat type bouillons

Base bouillons of the chicken, mutton, pork and beef type, were prepared using appropriate commercial origin cubes.

These base stocks or bouillons were then used to prepare flavored bouillons, through addition of the following ingredients, in the proportions indicated.

| | Flavored bouillons (type) | | | | | | | |
|---|---|---|---|---|---|---|---|---|
| | CHICKEN (parts by weight) | | MUTTON (parts by weight) | | BEEF (parts by weight) | | PORK (parts by weight) | |
| Ingredients | A | B | C | D | E | F | G | H |
| Base bouillon | 99.70 | 99.70 | 99.70 | 99.70 | 99.70 | 99.70 | 99.70 | 99.70 |
| Appropriate flavor* | 0.03 | 0.03 | 0.03 | 0.03 | 0.03 | 0.03 | 0.03 | 0.03 |
| Appropriate fat hydrolsate** | — | 0.27 | — | 0.27 | — | 0.27 | — | 0.27 |

*Chicken bouillon: chicken type flavor n° 569 257 TH; origin: Firmenish SA, Geneva, Switzerland
Mutton bouillon: mutton type flavor n° 700042.50 SPM; origin: Firmenish SA, Geneva, Switzerland
Beef bouillon: beef type flavor n° 700138.01 SPM; origin: Firmenish SA, Geneva, Switzerland
Pork bouillon: ham type flavor n° 700158.02 TH; origin: Firmenish SA, Geneva, Switzerland
**Chicken bouillon: for example, hydrolysate n° 18, example 5
Mutton bouillon: for example, hydrolysate n° 1, 4 or 9, example 4
Beef bouillon: for example, hydrolysate n° 22, example 5
Porkbouillon: for example, hydrolysate n° 25 or 29, example 5

The flavored bouillons thus prepared were evaluated on a blind test, two by two, by meat type, by a panel of expert flavorists. The results of these evaluations showed a unanimous preference of the flavorists for bouillons B, D, F and H, with regard respectively to bouillons A, C, E and G.

According to the flavorists' opinion, the preferred bouillons possessed a markedly enhanced roundness and volume, relative to those of the less preferred bouillons, and their flavor note was far creamier and velvety, giving a richer and fuller feeling in the mouth.

EXAMPLE 20

Flavoring compositions of the, vegetable oil type

Flavoring compositions of the peanut and olive oil type were prepared by mixing the following ingredients, in the proportions indicated:

| | Flavoring compositions (type) | | | |
|---|---|---|---|---|
| | peanut oil (parts by weight) | | olive oil (parts by weight) | |
| Ingredients | A | B | C | D |
| Appropriate commercial oil | 80 | — | 90 | — |
| Appropriate flavor* | 20 | 20 | 10 | 10 |
| Appropriate hydrolysate** | — | 80 | — | 90 |

*peanut oil type flavor: n° 50293 AH; origin: Firmenich SA, Geneva, Switzerland
olive oil type flavor: n° 502809 T; origin: Firmenich SA, Geneva, Switzerland
**Hydrolsate n° 11, example 5, for the peanut oil type compositions
Hydrolsate n° 10, example 5, for the olive oil type compositions The flavoring compositions thus prepared were evaluated on a blind test by a panel of expert flavorists, in aqueous salt solutions having 0.5% of NaCl, to which had been added compositions of the peanut oil type, at the rate of 600 ppm, and olive oil type compositions at the rate of 500 ppm.

In the flavorists' unanimous opinion, the solution containing composition B was preferred to that of composition A, as a result of its rounder and richer taste, which had clearly more impact on the mouth. Likewise, the flavor of composition D was clearly preferred to that of composition C, the impact of which in the mouth was distinctly less satisfactory.

We claim:

1. Process for the preparation of a flavoring composition, wherein a diglyceride fraction of a hydrolyzate of an animal or vegetable fat is added to a flavoring ingredient, solvent or adjuvant of current use, the diglyceride fraction being essentially free from any mono- or triglycerides, or free fatty acids, naturally present in the fat hydrolyzate.

2. Process according to claim 1, characterized in that said hydrolyzate is a butter or milk hydrolyzate, or a hydrolysate of mutton, beef, pork, lamb or chicken fat, or of fish, olive or peanut oil.

3. Process according to claim 1, characterized in that there is further added one or more compounds selected from the group consisting of butyric acid, decanoic acid, hexanoic acid, octanoic acid, dec-9-enoic acid, 4-methylnonanoic acid, 4-methyloctanoic acid, 2-methylheptanoic acid, oleic acid, hexadecanoic acid, pentadecanoic acid, 2-methylhexanoic acid, 2-methylbutanoic acid, heptadecanol, hexadecanol and 2-tetradecanone.

4. Process according to claim 3, characterized in that there is added a mixture formed by all the compounds of said group.

5. Process according to claim 3, characterized in that there is added a mixture formed by oleic, hexadecanoic, 4-methylnonanoic, 4-methyloctanoic, 2-methylheptanoic, 2-methylhexanoic and 2-methylbutanoic acids.

6. Process according to claim 1, characterized in that there is further added a hydrolyzate of an animal or vegetable fat.

7. Process for the preparation of a flavoring composition, characterized in that there is added to a hydrolyzate of an animal or vegetable fat at least one compound selected from the group consisting of butyric acid, decanoic acid, hexanoic acid, octanoic acid, dec-9-enoic acid, 4-methylnonanoic acid, 4-methyloctanoic acid, 2-methylheptanoic acid, oleic acid, hexadecanoic acid, pentadecanoic acid, 2-methylhexanoic acid, 2-methylbutanoic acid, heptadecanol, hexadecanol and 2-tetradecanone.

8. Process according to claim 7, characterized in that there is added a mixture formed by all the compounds of said group.

9. Process according to claim 8, characterized in that there is added a mixture constituted by oleic, palmitic, 4-methylnonanoic, 4-methyloctanoic, 2-methylheptanoic, 2-methylhexanoic and 2-methylbutanoic acids.

10. Process according to claim 7, characterized in that the hydrolyzate of an animal fat is a butter or milk hydrolyzate, or a hydrolyzate of mutton, beef, pork, lamb or chicken fat, or of fish, olive or peanut oil.

11. Process according to claim 7, characterized in that there is further added a diglyceride fraction of a hydrolyzate of an animal or vegetable fat.

12. Process according to claim 11, characterized in that the of an animal fat is a butter or milk or a of mutton, beef, pork, lamb or chicken fat.

13. Process according to claim 1, characterized in that the hydrolyzate of an animal or vegetable fat is obtained by enzymatic hydrolysis of said fat, at a temperature and during an mount of time sufficient to ensure a degree of hydrolysis of at least about 30 %.

14. Process according to claim 13, characterized in that the hydrolyzate of an animal or vegetable fat contains at least about 30% by weight of diglycerides and not more than 2% by weight of monoglycerides, relative to the weight of the hydrolyzate.

15. Flavoring composition resulting from the process according to claim 1.

16. Process to impart, improve or enhance the mouthfeel of a foodstuff or beverage, characterized in that there is added to said foodstuff or beverage a flavoring composition according to claim 15.

17. Foodstuff or beverage comprising a flavoring composition according to claim 15.

18. Foodstuff according to claim 17, in the form of butter or margarine, a dairy product, a mayonnaise, a soup, a sauce, a ready-to-eat cooked meal, a sweet or savory biscuit, or a dessert.

* * * * *

UNITED STATES PATENT AND TRADEMARK OFFICE
CERTIFICATE OF CORRECTION

PATENT NO. : 5,695,802

DATED : December 9, 1997

INVENTOR(S) : Van Den Ouweland et al.

It is certified that error appears in the above-identified patent and that said Letters Patent is hereby corrected as shown below:

Column 23, line 3: change "hydrolyzate" to --hydrolysate--.

Column 23, line 7: change "hydrolyzate" to --hydrolysate--.

Column 23, line 9: change each occurrence of "hydrolyzate" to --hydrolysate--.

Column 23, line 28: change "hydrolyzate" to --hydrolysate--.

Column 23, line 30: change "hydrolyzate" to --hydrolysate--.

Column 24, line 6: change each occurrence of "hydrolyzate" to --hydrolysate--.

Column 24, line 7: change "hydrolyzate" to --hydrolysate--.

Column 24, line 10: change "hydrolyzate" to --hydrolysate--.

Column 24, line 13: after "the" insert --hydrolysate--; after "milk" insert --hydrolysate--; and after "or a" insert --hydrolysate--.

UNITED STATES PATENT AND TRADEMARK OFFICE
CERTIFICATE OF CORRECTION

PATENT NO. : 5,695,802
DATED : December 9, 1997
INVENTOR(S) : Van Den Ouweland, et al It is certified that error appears in the above-identified patent and that said Letters Patent is hereby corrected as shown below:

Column 24, line 16: change "hydrolyzate" to --hydrolysate--.

Column 24, line 18: change "mount" to --amount--.

Column 24, line 21: change "hydrolyzate" to --hydrolysate--.

Column 24, line 24: change "hydrolyzate" to --hydrolysate--.

Signed and Sealed this

Third Day of March, 1998

*Attest:*

BRUCE LEHMAN

*Attesting Officer*    Commissioner of Patents and Trademarks